(12) United States Patent
Kane et al.

(10) Patent No.: US 11,042,555 B1
(45) Date of Patent: Jun. 22, 2021

(54) TWO STEP ALGORITHM FOR NON-EXACT MATCHING OF LARGE DATASETS

(71) Applicant: Bottomline Technologies (de) Inc., Portsmouth, NH (US)

(72) Inventors: Mark G. Kane, Bayside, NY (US); Richard J. Diekema, Jr., South Portland, ME (US); Kaiyu Pan, Johns Creek, GA (US)

(73) Assignee: Bottomline Technologies, Inc., Portsmouth, NH (US)

( * ) Notice: Subject to any disclaimer, the term of this patent is extended or adjusted under 35 U.S.C. 154(b) by 259 days.

(21) Appl. No.: 16/455,811

(22) Filed: Jun. 28, 2019

(51) Int. Cl.
| | |
|---|---|
| *G06F 17/00* | (2019.01) |
| *G06F 16/2458* | (2019.01) |
| *G06F 16/903* | (2019.01) |
| *G06F 17/18* | (2006.01) |
| *G06K 9/62* | (2006.01) |
| *G06F 40/109* | (2020.01) |
| *G06F 40/166* | (2020.01) |

(52) U.S. Cl.
CPC ........... *G06F 16/2468* (2019.01); *G06F 16/90348* (2019.01); *G06F 17/18* (2013.01); *G06F 40/109* (2020.01); *G06F 40/166* (2020.01); *G06K 9/6215* (2013.01)

(58) Field of Classification Search
CPC .......... G06F 40/166; G06F 40/109; G06F 16/2468; G06F 16/90348; G06F 17/18
See application file for complete search history.

(56) References Cited

U.S. PATENT DOCUMENTS

| | | | |
|---|---|---|---|
| 5,600,835 A | 2/1997 | Garland | |
| 6,845,369 B1 | 1/2005 | Rodenburg | |
| 7,822,598 B2* | 10/2010 | Carus ................... | G06F 40/242 704/9 |
| 9,607,103 B2* | 3/2017 | Anderson ......... | G06F 16/90335 |
| 10,235,356 B2 | 3/2019 | Amend et al. | |
| 10,242,258 B2* | 3/2019 | Guo ..................... | G06F 16/215 |
| 2006/0155751 A1* | 7/2006 | Geshwind .......... | G06F 16/3322 |
| 2009/0174667 A1 | 7/2009 | Kocienda | |
| 2013/0117246 A1* | 5/2013 | Cabaniols ............ | G06F 40/194 707/697 |
| 2015/0039473 A1 | 2/2015 | Hu | |
| 2016/0041984 A1 | 2/2016 | Kaneda | |
| 2017/0039219 A1 | 2/2017 | Acharya | |
| 2017/0177743 A1* | 6/2017 | Bhattacharjee ... | G06F 16/90344 |

(Continued)

OTHER PUBLICATIONS

Schulz, Klaus and Stoyan Mihov, "Fast String Correction with Levenshtein-Automata", IJDAR (2002) 5: 67. https://doi.org/10.1007/s10032-002-0082-8.

(Continued)

*Primary Examiner* — Laurie A Ries
(74) *Attorney, Agent, or Firm* — Richard A. Baker, Jr.

(57) ABSTRACT

A two step algorithm for conducting near real time fuzzy searches of a target on one or more large data sets is described. This algorithm includes the simplification of the data by removing grammatical constructs to bring the target search term (and the stored database) to their base elements and then perform a Levenstein comparison to create a subset of the data set that may be a match. Then performing a scoring algorithm while comparing the target to the subset of the data set to identify any matches.

20 Claims, 6 Drawing Sheets

(56) References Cited

U.S. PATENT DOCUMENTS

2019/0347281 A1\* 11/2019 Natterer .............. G06F 16/3344

OTHER PUBLICATIONS

Brasetvik, Alex, "Elasticsearch from the Bottom up, Part 1", Elastic, Sep. 16, 2013. Webpage found at https://www.elastic.co/blog/found-elasticsearch-from-the-bottom-up on Jun. 17, 2019.

"Lucene's FuzzyQuery is 100 times faster in 4.0", blog post in Changing Bits blog on Mar. 24, 2011. Webpage found at http://blog.mikemccandless.com/2011/03/lucenes-fuzzyquery-is-100-times-faster.html on Jun. 17, 2019.

Fenz, Dustin, et al, "Efficient Similarity Search in Very Large String Sets", conference paper, Jun. 2012.

\* cited by examiner

TWO STEP ALGORITHM FOR NON-EXACT MATCHING OF LARGE DATASETS

BACKGROUND

Prior Application

This is a priority application.

Technical Field

The present disclosure relates generally to non-exact pattern matching and more particularly to the non-exact pattern matching of large datasets.

Description of the Related Art

Fraud and security are top priorities for organizations of all sizes globally. Losses due to fraud in the banking industry rose to $2.2 billion in 2016, up 16 percent from 2014, according to the latest American Bankers Association (ABA) Deposit Account Fraud Survey Report. With over 70% of companies reported to have suffered at least one type of fraud in the past year, today's organizations need all the protection they can get. The impact of new regulations such as the SWIFT Customer Security Programme, Sarbanes Oxley and Dodd-Frank, as well as increased responsibility to ensure that financial transactions not in violation of imposed sanctions, are of critical risk concern to enterprises of all sizes. In addition, bank failures and the fragility of the macro-economic environment all represent risk.

In order to meet compliance and customer expectations in the detection of fraud, several organizations maintain lists of entities and persons known to be associated with fraud. Other organizations maintain lists of individuals and organizations that are politically connected and possibly subject to bribery and corruption.

Business applications often want to search through these lists, which comprise a large number of 'Bad Entities' to see if a given 'Target Entity' is a suspect. In this document the data store of 'Bad Entities' is considered to be the 'Source' being searched. The 'Source' may be obtained from:

A governmental body, which has identified a number 'Entities' that were sanctioned.
A list of politically exposed persons (PEP).
A list of bad entities identified internally by an organization or business.
An aggregation of many 'Bad Guy Lists'.

Sometimes more than one 'Source' may need to be checked, because a 'Bad Entity' may appear on one list but not another list. These lists may include up to 30 million names.

While a simple search may work, it is not complete, because small errors will prevent matches. As a result, a Levenshtein Distance comparison and other fuzzy query techniques are performed to match non-exact data. See U.S. Pat. No. 10,235,356, "Dual authentication method for identifying non-exactly matching text" for further information on non-exactly matching algorithms, said patent incorporated herein by reference.

The sheer size of the lists to compare, over 30 million names, makes this comparison computationally overwhelming. Cache techniques, huge memory stores, hashing, binary search technique fail to perform searches within a reasonable timeframe. A new approach to comparing a name to a potential fraud list is needed in the industry. The present inventions resolve this issue.

SUMMARY OF THE INVENTIONS

A method for locating a target in a watch list is described herein. The method is made up of the steps of (1) searching for a subset of records in the watch list that most closely match the target, wherein the searching step includes (1.a) reading a record from the watch list, (1.b) performing a search Levenstein distance calculation on the target and the record; and (1.c) storing the record in a subset list if the search Levenstein distance calculation is greater than a threshold. The method also includes (2) scoring the records in the subset list. The scoring step includes (2.a) looping through each field of the records in the subset list, (2.b) calculating a score Levenstein distance between the field in the record in the subset list and the field in the target, (2.c) checking that the score Levenstein distance is greater than the threshold, and going to a next record in the loop if the score Levenstein distance is greater than the threshold, (2.d) summing a product of the score Levenstein distance multiplied by a weight factor for the field; and (2.e) dividing the product by the sum of the field weights to derive a weighted mean score for the record. The method also includes the step of (3) indicating that the target is located in the watch list if at least one weighted mean score is calculated.

In some embodiments, the method also includes the step of creating the watch list from one or more source lists. The step of creating the watch list includes (a) reading an entry from the one or more source lists, (b) simplifying the entry in the one or more source lists, (c) splitting the entry in the one or more source lists, and (d) storing the entry in the watch list as a new record.

Simplifying could include converting all capital letters to lower case or removing repeated letters.

In some embodiments, the method of building of the watch list could include transforming one or more portions of the record to enhance the performance of searches using Levenstein distance calculations.

The method could include simplifying the target. The simplifying could include removing punctuation or consolidating all geographic terms into a selected geographic term.

In one embodiment, the searching and the scoring are performed in parallel, and in another embodiment, the searching and the scoring are performed in series. The searching and the scoring could be distributed across a plurality of special purpose, high performance computing servers.

The weighted mean score for the records could be sorted, and in some embodiments, the method indicates the record with a best match to the target.

In some embodiments, the scoring step also include selecting fields configured for boosting the weighted mean score for the record, and incorporating the field score in the weighted mean score for the field configured for boosting if the field score increases the weighted mean score.

The present inventions also include a method for locating a target in a watch list. This method is made up of (1) a step for searching for a subset of records in the watch list that most closely match the target by performing a search Levenstein distance calculation on the target and on each record in the watch list, (2) a step for scoring the records in the subset by calculating a weighted mean score for each record with a score Levenstein distance greater than a threshold, and (3) indicating that the target is located in the watch list if at least one weighted mean score is calculated.

In some embodiments, the step for scoring further includes incorporating a field score in the weighted mean score for boost configured fields if the field score increases the weighted mean score.

BRIEF DESCRIPTION OF THE DRAWINGS

The annexed drawings, which are not necessarily to scale, show various aspects of the inventions in which similar reference numerals are used to indicate the same or similar parts in the various views.

DETAILED DESCRIPTION

Figure 1:
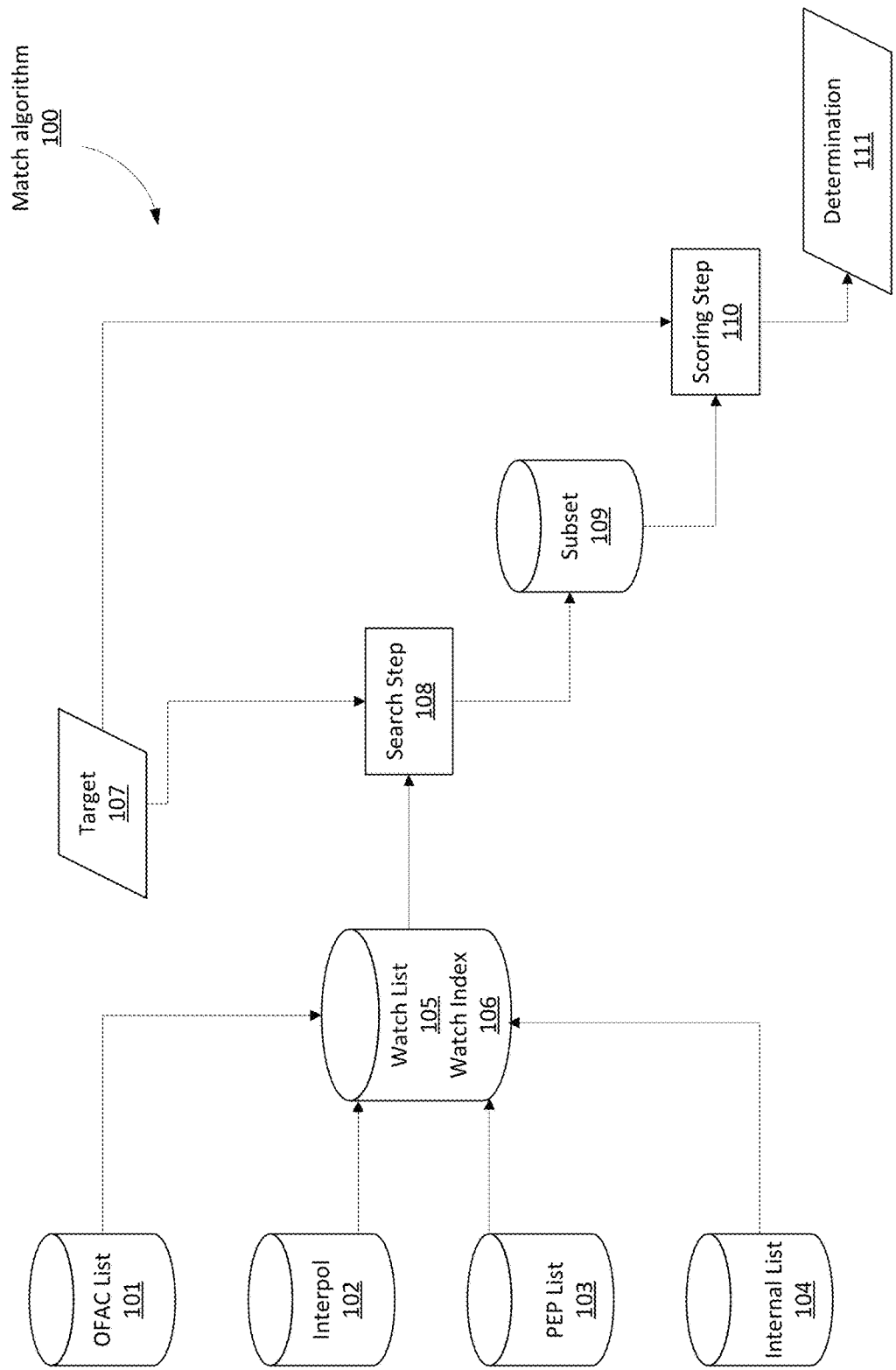
FIG. 1 is a schematic diagram of the overall architecture of the two step watch list search.

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The present disclosure provides in one embodiment a computer-implemented method for providing medium two step algorithm for the non-exact pattern matching of large datasets. The method is performed at least in part by circuitry and the data comprises a plurality of data items.

The 'Watch List Screening' (WLS) module uses a two step process to wade through a large number of these 'Source Entities' 101,102,103,104 to find possible matches for 'Target Entities' 107 being checked. The first is the 'Search Step' 108 and the second is the 'Scoring Step' 110.

The first step (the 'Search Step') 108 utilizes various searching techniques provided by the Elasticsearch (ES) platform. One of these is a fuzzy query that uses similarity based on the Levenshtein Edit Distance.

By carefully preparing the 'Source Data' 105 to be searched, and then indexing 106 that 'Source Data' during the loading process (using configuration options that are specified in the 'ES Index Template') Elasticsearch can perform a search 108 and willow down or reduce the number of possible candidates which should be scored 109. This subset list of possible candidates 109 is then passed to the second step (the 'Scoring Step') 110.

The goal of the first step 108 is always to reduce the number of possible candidates to be as small as possible.

Reducing the number of possible candidates is always a balancing act. If too many 'possible candidates' are gathered (too many false positives), then the 'Scoring Mechanism' 110 will be flooded which will significantly prolong the time needed to return a score.

Conversely, tightening the net too much during the first step may result in missing a few possible hits in the subset list 109.

Fortunately, Elasticsearch (ES) provides a number of ways to configure the fuzzy query used in the first step 108 to strike a proper balance. This is explained in the Query Template—Step 1—'Search' Configuration (ES) section of this document.

The second step (the 'Scoring Step') 110 uses a 'Scoring Plug-In' 110 to score each of the possible candidates 109 returned by the query in the first step (the 'Search Step') 108. It further reduces the subset list of possible candidates 109 by only returning 'Suspected Entities' 111 based on close matches having scores that are above a specified threshold. Exactly how the 'Scoring Step' 110 works will be discussed later in this document.

Both the first step (the 'Search Step') 108 and the second step (the 'Scoring Step') 110 are defined and configured in the query template. The query template consists of two sections; the first for configuring the parameters which the 'Searching Tools' use in the 'Search Step' 108, and the second for configuring the Scoring Plug-In used in the 'Scoring Step' 110. In some embodiments, the query parameters are submitted with a personal computer or similar 601, and the query parameters, once entered, are sent to the server 603 running the matching algorithm 100.

The first step (the 'Search Step') 108 in particular depends on having a properly configured query template which guides 108 in how to search against the various indexed fields for a given source 105 that are specified in the index template 106. Correspondingly, for the first step 108 to efficiently find possible candidates 109, it is critical to have a properly configured index template that is tuned specifically for the 'Source Data' being searched.

It is also important to properly configure the 'Fields of Interest' as part of the field map configuration for the source being searched. This "Field Map Configuration" will be used during the loading process to associate 'Fields of Interest' in the Source Input file 101,102,103,104, with what will be indexed using the ES Index Template 106.

Elasticsearch is a search engine 108 that provides a distributed, multitenant-capable full-text search engine with an HTTP web interface and schema-free documents. It performs fuzzy searches based on edit distance (for example, a Levenshtein algorithm) and excels at recommending documents with very similar structural characteristics and more narrow relatedness. Elasticsearch performs scalable searches in near real-time.

Looking to FIG. 1, the process starts with one or more databases of names and information regarding the people on the various watch lists. These databases could include the OFAC List 101. This list is maintained by the US Government Department of the Treasury, and includes individuals and companies owned or controlled by, or acting for or on behalf of, targeted countries (countries that US National policy or security have designated as restricted). It also lists individuals, groups, and entities, such as terrorists and narcotics traffickers designated under programs that are not country-specific. Interpol, the International Criminal Police Organization, maintains databases 102 related to the criminal history of individuals as well as on stolen and counterfeit documents.

There are a number of commercial sources of Politically Exposed Persons (PEP) lists 103. A politically exposed person is someone who is or has been entrusted with prominent public functions by a sovereign, for example Heads_of state or Heads of government, senior politicians, senior government, judicial or military officials, senior executives of state owned corporations, important political party officials. Some lists include family members or close associates, any individual publicly known, or known by the financial institution to be a close personal or professional associate of a politically exposed person. The PEP lists 103 tend to be quite large, with millions or tens of millions of records. These lists are privately maintained and sold by a number of companies.

Internal lists 104 are lists developed by the entity used the present inventions. This could include individuals and entities that have committed fraud or problems for the entity, or could include employees and officers of the entity, to prevent self-dealing.

Figure 3:
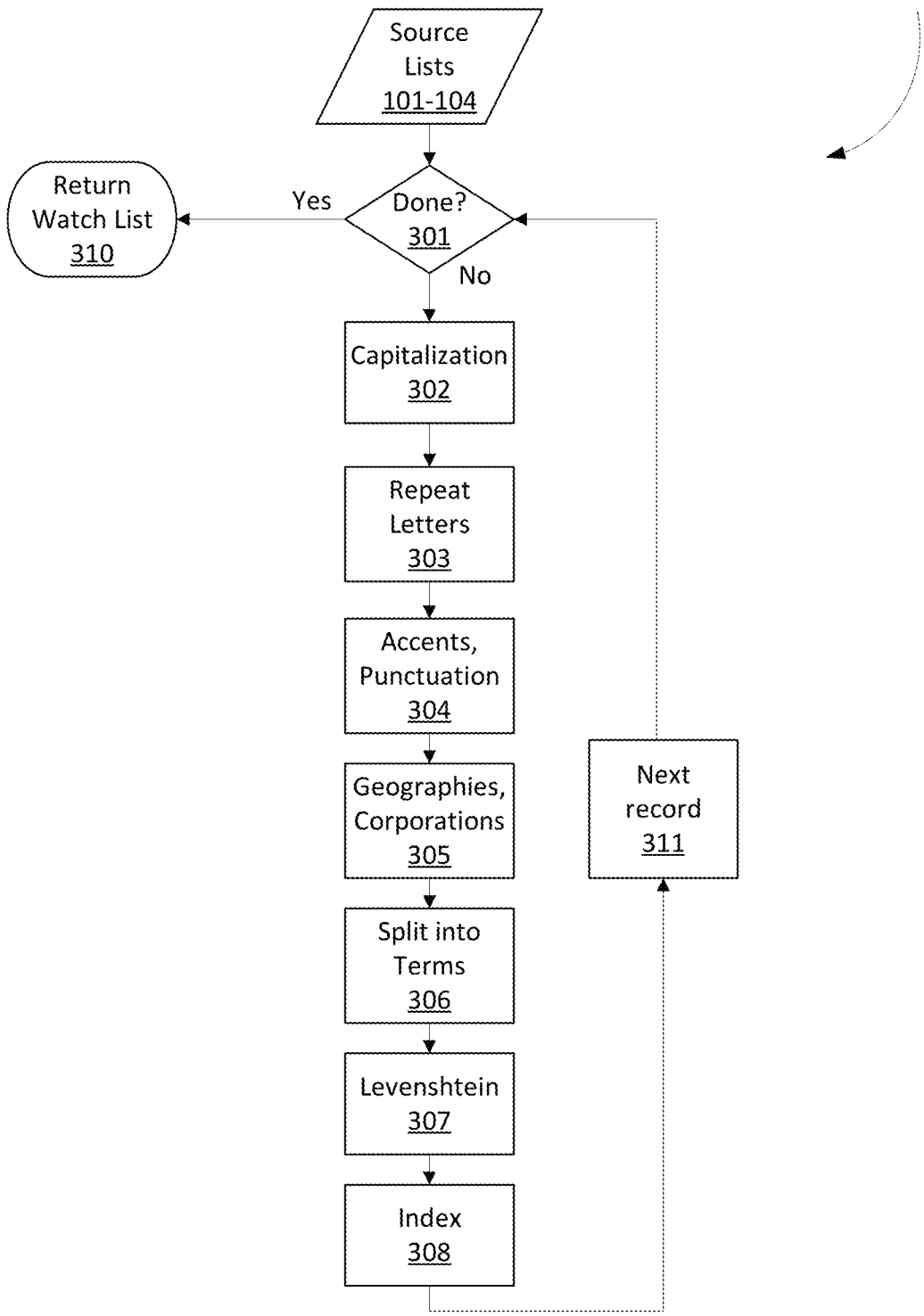
FIG. 3 is a flow chart of one embodiment of the watch list creation.

One of more of the OFAC list 101, the Interpol databases 102, the PEP lists 103, and the internal lists 104, perhaps also including other databases or lists, are preprocessed and combined into a watch list 105 and a watch index 106. FIG. 3 shows this process. In many embodiments, the source lists 101, 102, 103, 104 are converted to comma separated lists, and each comma separated list is preprocessed and inserted into the watch list 105 while maintaining the watch index 106.

Often a single 'Bad Entity' may be reported with a set of related 'Aliases' or AKA's (also known as). Thus, a single 'Bad Entity' may have more than one 'Field Value' for a field like 'personFullname' for example. The CSV Source Input File loader, provided with this module has the facility to load in and associate several 'Field Values' for a single 'Field Name'. Other embodiments can incorporate additional source file types, such as XML, JSON, XLS, XLXS, PDF, .DB, .ACCDB, .NSF, .FP7 and other database file formats.

It's important to remember that each 'Bad Entity' should be associated with a unique 'Source UID' so that should a 'Hit' be scored during checking, this unique 'Source UID' can be returned and then referenced back to the source data. Normally the 'Source UID' is the first field of data in each CSV line of data being loaded. There should be one 'Source UID' per 'Source Entity'. This is expected in the system and it should be implemented this way even when using a 'Custom Field Map'.

It should be noted that even data fields which cannot be provided on the 'Target Side' may still prove valuable; they might need to be returned (from the 'Source Data') as part of any 'Watch List Hit'.

In determining any 'Custom Field Map' it must also be ascertained which fields from the 'Source Data Store' will never be used (Don't Use field in Table 2). These are excluded in some embodiments from the 'Field Map' and also from the 'CSV Formatted—Source Input File' which will be loaded.

The more targeted the data 101, 102, 103, 104 is when loaded, indexed, queried and then scored, the more efficient the entire process will be.

It's also important to remember that different Source Data Stores (Indexes) 106 can and should be used for different 'Business Applications'. Upon examining the 'Source Data' it may be determined that certain types of entities (Business vs. Person) may need to be treated differently. Such entities may be separated into their own CSV formatted—Source Input files 101, 102, 103, 104. For example, if only 'Sanctions Data' needs to be checked for 'Payments' then only 'Sanctions Data' should be loaded into its own dedicated CSV formatted—Source Input file.

The data input may include the first name, the middle name, the last name, nationality, street address, city, state, country, postal code, date of birth and gender. Only the first name and last name may be critical for matching purposes, and the address may be less critical. The gender may never be used, for example.

Figure 2:
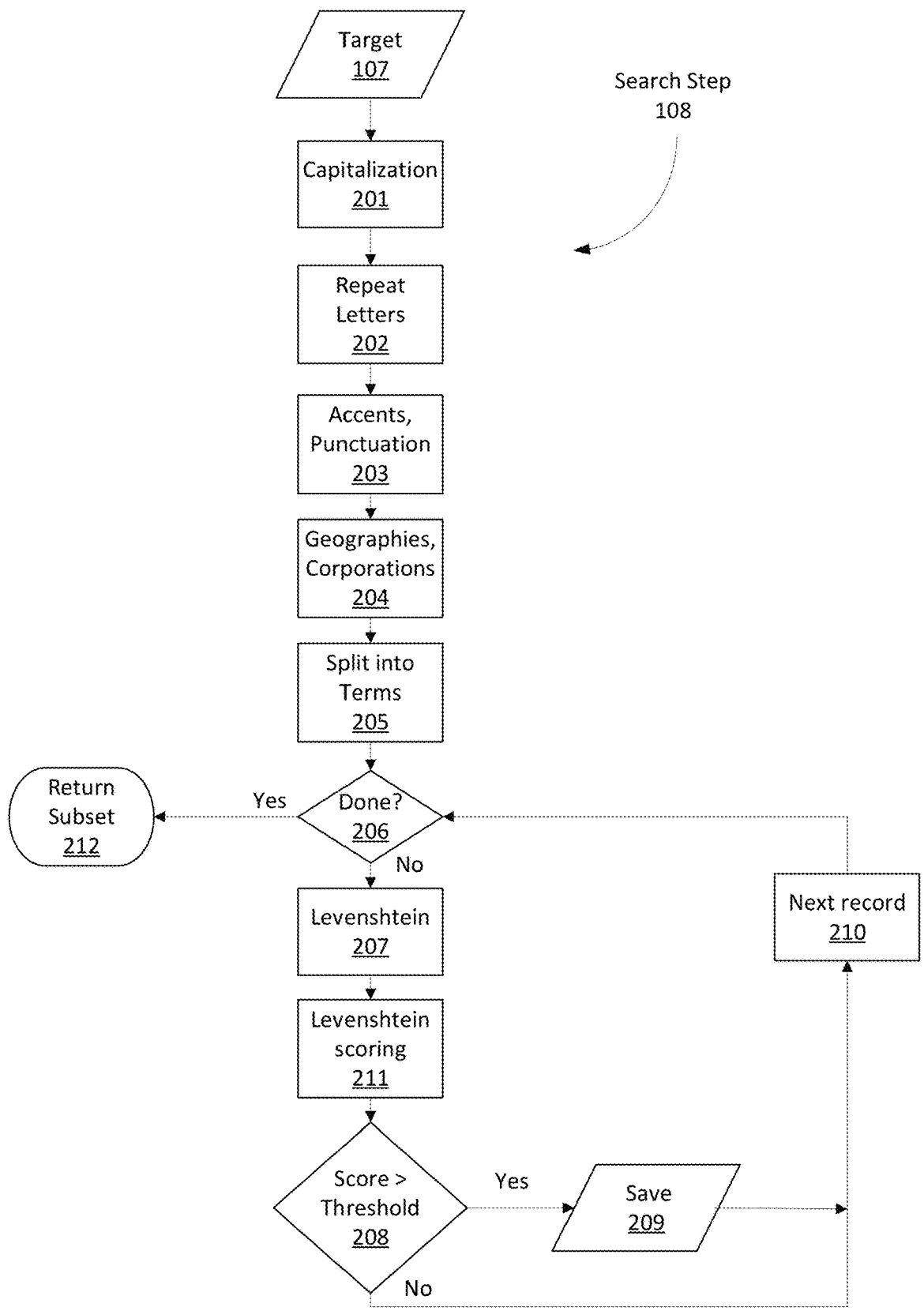
FIG. 2 is a flow chart of one embodiment of the search step.
Figure 4:
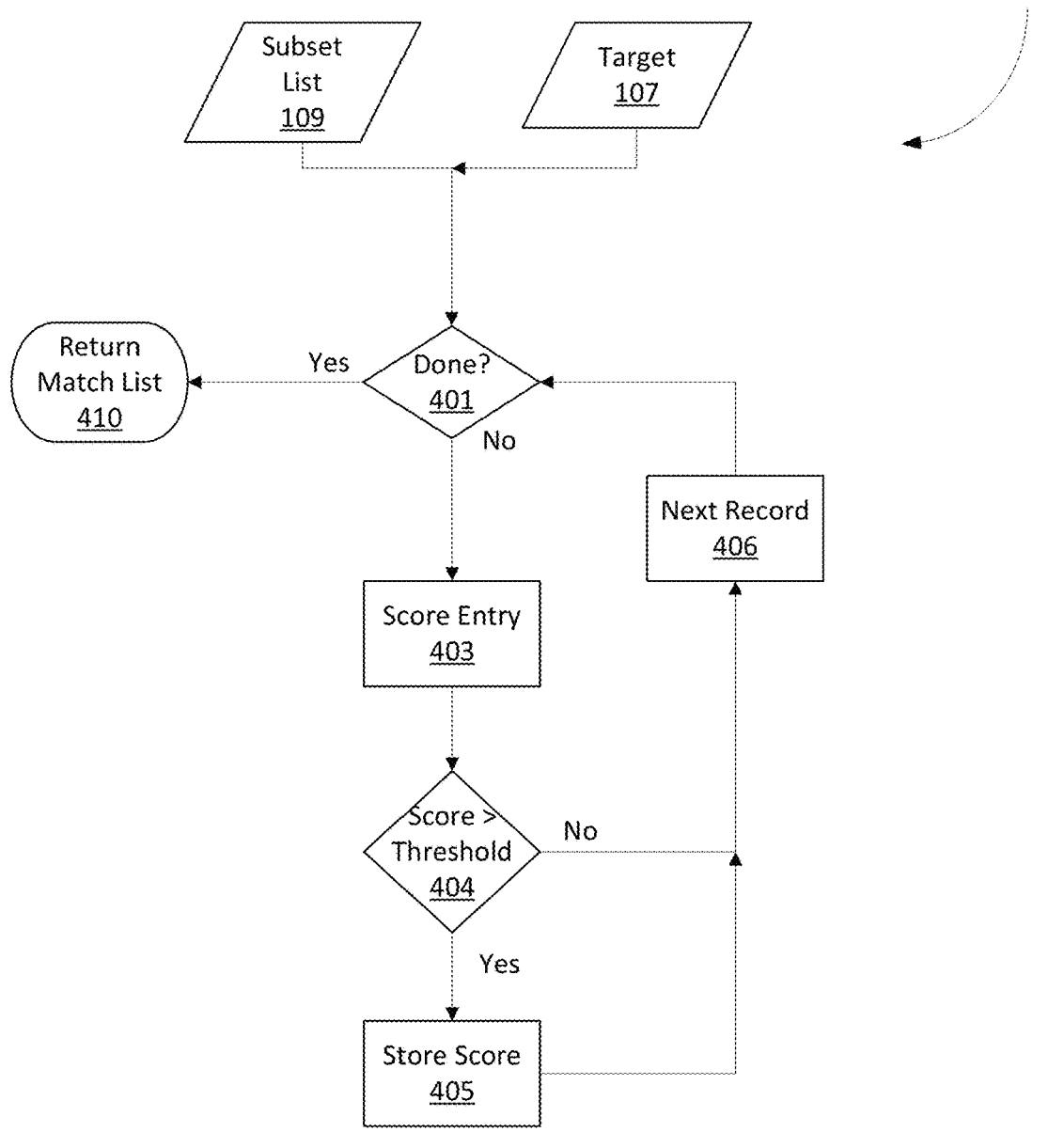
FIG. 4 is a flow chart of one embodiment of the scoring step.

Returning to FIG. 1, the watch list 105 and watch index 106 are used by the search step 108 in the search for the target 107. FIG. 2 details the search step 108. The search step 108 searches the watch list 105 for a subset 109 of records that could be matches for the target 107. Once the subset list 109 is formed, the subset list 109 is sent to the scoring step 110 for secondary comparison to the target 107. If any of the scores are above a threshold, then the determination 111 indicates a match. If no scores exceed the threshold then the determination 111 indicates no match. FIG. 4 details the Scoring Step 110.

In some embodiments, the scoring step 110 is called in parallel with the search step 108, as a subroutine by the search step 108 directly whenever a match is found, so that when the subset list 109 is created, the score is stored as well. In other embodiments, the subroutine outlined in FIG. 5, score entry 403 is executed in parallel as called as a subroutine from the search step 108. In still another embodiment, the scoring step 110 is executed in serial, once the search step 108 is completed.

Looking to FIG. 3, we see the algorithm for the creation of the watch list 300. The process transforms the source lists 101, 102, 103, 104 into the watch list 105 and the watch list index 106. The overall algorithm is a "for loop" 301,311 processing each field of each entry in each of the source lists 101, 102, 103, 104. A record is added to the index once the normalization is finished. When there are no more entries to process, the routine exits and returns the watch list 310. While the processing of all entries in the lists 301 is not complete, the algorithm starts by removing all capitalization 302 from each field, converting everything to lower case. Next all repeated letters are removed 303, so, for instance, the word "letter" becomes "leter". Then all punctuation, titles, spaces and accents are removed 304 from each field. Articles ("a", "an", "the") are removed. Letters with accents are converted to a letter without the accent. For instance, a is converted to an a. All geographic and corporate terms are then normalized 305. For instance, changing LLC, Corp, and similar to Inc, and changing all references to the United States, US, USA, etc to US (this is configurable in some embodiments). Then each term or name is split into tokens 306. In some embodiments, this split could be each word, or each syllable or each phrase. The order of the steps in FIG. 3 can be changed without deviating from the inventions disclosed herein.

In one embodiment, the algorithm pre-processes the terms for Levenshtein automaton 307. This step includes creating a parametric and generic description of states and transitions of the Levenshtein automation. See "Fast String Correction with Levenshtein-Automata", a paper by Klaus Schulz and Stoyan Mihov, included herein by reference, for more information on this step.

Finally, the algorithm builds inverted indexes 308. In doing so, there are a few things we need to prioritize: search speed, index compactness, and indexing speed. Changes are not important and the time it takes for new changes is not important, because the source lists 101, 102, 103, 104 are not updated in real time. In some embodiments, the entire watch list 106 and watch index 106 are regenerated to accommodate a change.

Search speed and index 106 compactness are related: when searching over a smaller index 106, less data needs to be processed, and more of it will fit in memory. Both, particularly compactness, come at the cost of indexing speed, which is not important in this system.

To minimize index 106 sizes, various compression techniques are used. For example, when storing the postings (which can get quite large), the algorithm does tricks like delta-encoding (e.g., [42, 100, 666] is stored as [42, 58, 566]), using a variable number of bytes (so small numbers can be saved with a single byte).

Keeping the data structures small and compact means sacrificing the possibility to efficiently update them. This algorithm does not update the indices 106 at all: the index files 106 are immutable, i.e. they are never updated. This is quite different to B-trees, for instance, which can be updated and often lets you specify a fill factor to indicate how much updating you expect.

In some embodiments, the index consists of three fields, the term, its frequency, and its locations. Let's say we have these three simple documents: (1) "Winter is coming.", (2) "Ours is the fury." and (3) "The choice is yours." After some simple text processing (lowercasing, removing punctuation and splitting words), we can construct the "inverted index" shown in the figure.

TABLE 1

| Term | Frequency | Location |
|---|---|---|
| choice | 1 | 3 |
| coming | 1 | 1 |
| fury | 1 | 2 |
| is | 3 | 1, 2, 3 |
| ours | 1 | 2 |
| the | 2 | 2, 3 |
| winter | 1 | 1 |
| yours | 1 | 3 |

The inverted index maps terms to locations (and possibly positions in the locations) containing the term. Since the terms in columns 1 and 2 (the dictionary) are sorted, we can quickly find a term, and subsequently its occurrences in the postings-structure. This is contrary to a "forward index", which lists terms related to a specific location.

A simple search with multiple terms is then done by looking up all the terms and their occurrences, and take the intersection (for AND searches) or the union (for OR searches) of the sets of occurrences to get the resulting list of documents. More complex types of queries are obviously more elaborate, but the approach is the same: first, operate on the dictionary to find candidate terms, then on the corresponding occurrences, positions, etc.

Consequently, an index term is the unit of search. The terms we generate dictate what types of searches we can (and cannot) efficiently do. For example, with the dictionary in the figure above, we can efficiently find all terms that start with a "c". However, we cannot efficiently perform a search on everything that contains "ours". To do so, we would have to traverse all the terms, to find that "yours" also contains the substring. This is prohibitively expensive when the index is not trivially small. In terms of complexity, looking up terms by their prefix is $O(\log(n))$, while finding terms by an arbitrary substring is $O(n)$.

In other words, we can efficiently find things given term prefixes. When all we have is an inverted index, we want everything to look like a string prefix problem. Here are a few examples of such transformations. Not all embodiments use all of the examples.

1. To find everything ending with "tastic", we can index the reverse (e.g. "fantastic"→"citsatnaf") and search for everything starting with "citsat".

2. Finding substrings often involves splitting terms into smaller terms called "n-grams". For example, "yours" can be split into "^yo", "you", "our", "urs", "rs$", which means we would get occurrences of "ours" by searching for "our" and "urs".

3. For languages with compound words, like Norwegian and German, we need to "decompound" words like "Donaudampfschiff" into e.g. {"donau", "dampf", "schiff"} in order to find it when searching for "schiff".

4. Geographical coordinate points such as (60.6384, 6.5017) can be converted into "geo hashes", in this case "u4u8gyykk". The longer the string, the greater the precision.

5. To enable phonetic matching, which is very useful for people's names for instance, there are algorithms like Metaphone that convert "Smith" to {"SMO", "XMT"} and "Schmidt" to {"XMT", "SMT"}.

6. When dealing with numeric data (and timestamps), the algorithm automatically generates several terms with different precision in a trie-like fashion, so range searches can be done efficiently. Simplified, the number 123 can be stored as "1"-hundreds, "12"-tens and "123". Hence, searching for everything in the range [100, 199] is therefore everything matching the "1"-hundreds-term. This is different to searching for everything starting with "1", of course, as that would also include "1234", and so on.

7. To do "Did you mean?" type searches and find spellings that are close to the input, a "Levenshtein" automaton is built to effectively traverse the dictionary.

Once each of the entries in the Source lists 101, 102, 103, 104 are processed, the done check 301 returns yes, and the watch list is returned 310 from the routine.

While the above description of the watch list creation 300 is described as a series execution, in many embodiments the watch list is created using a parallel process, where numerous processors execute numerous processes (or threads) in parallel to create the watch list. Other than assuring that the index is created in coordination between the parallel processes, the remaining tasks in the watch list creation 300 process could be executed in isolation on separate processors and/or in separate processes.

FIG. 2 outlines the algorithm for performing the search 108 in the watch list 105 for the target 107.

The process begins by removing capitalization 201 from each field of the target, converting all letters to lower case. The repeat letters in the target fields are collapsed into a single letter 202. Accents, spaces, titles and punctuation are removed 203, and geographical locations and corporation designations and the like are converted a common terms 204. The target fields are then split into terms 205 (or syllables in some embodiments). For example, if the target name is "Dr. Joseph Louis Lin Manuel Hernánndez" may be converted to joseph louislinmanuel hernandez, with the capitalization removed, the spaces and punctuation removed from the middle names, the accent removed from the "á", and the repeated "n" collapsed into a single "n".

Next, the search step 108 algorithm works its way through the entries in the watch list 105 looking for similarities. In some embodiments, this is done with a for loop 206, 210, checking the Levenshtein distance 207 for each entry in the watch list 105 and scoring the record 211 using a Levenshtein distance normalized over the length of the field in characters score.

$$\text{score} = 1 - \frac{Levenshtein(record)}{length(record)}$$

Each entry where the Levenshtein distance normalized score is greater that a specified threshold 208, the entry is saved 209. In some embodiments, the entry is scored with a weighted mean score at this point in time 209 with the algorithm shown in FIG. 5, but only for the entries within the threshold.

In a more complicated embodiment, a hash algorithm could be used spanning the letters on either side on the keyboard of the target. So to search for "joseph" in the above example, the "u", "i", "j", "h", "k", "n" and "m" are checked with the hash, and the following letters are checked using the complex deterministic automation described in the "Fast String Correction with Levenshtein-Automata", a paper by Klaus Schulz and Stoyan Mihov.

In other embodiments, the performance of the Levenshtein algorithms is enhanced by filtering on the lengths of the watch list records. For instance, if the target name is 12 characters long and the maximum Levenshtein distance parameter is set to 2, then any watch list record that is less than 10 characters or more than 14 characters cannot match, and are immediately eliminated from the records that are reviewed in the loop. This technique alone may eliminate most of the records without the computational impact of performing a Levenshtein analysis.

Any of these approaches will result in a subset list 109 of the watch list 105 being returned 212, where the subset list 109 has the closest matches, in some embodiments returning 100 or upto 10,000 entries out of a 30 million entry watch list 105. In many embodiments, the loop is executed in parallel on many processors using many processes or threads to process the watch list.

Figure 5:
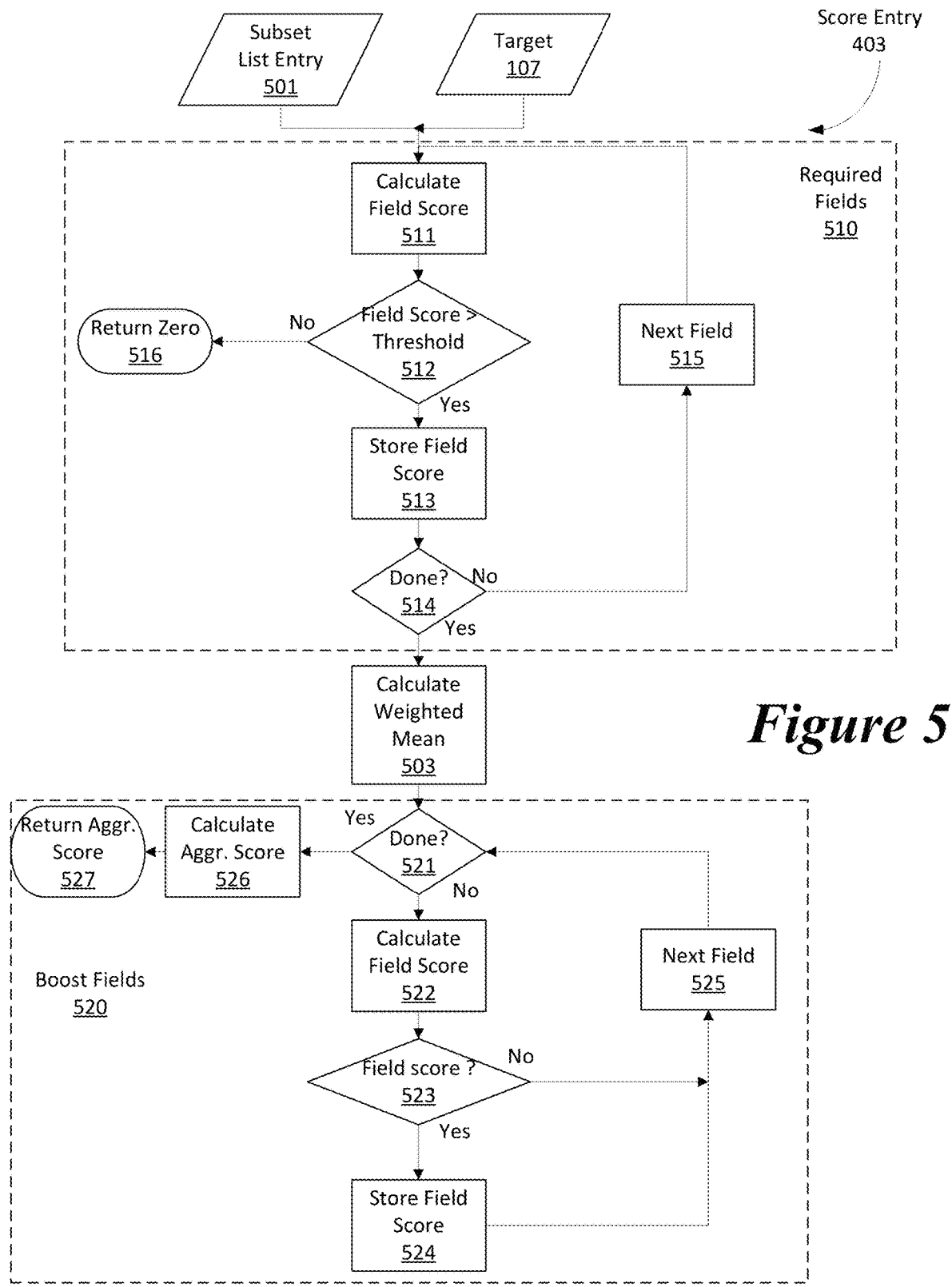
FIG. 5 is a flow chart of one embodiment of the scoring of a single record.

The scoring step is diagramed in FIG. 4 and FIG. 5. The overall algorithm is shown in FIG. 4. The subset list 109 and the target 107 are the inputs to this step. The process loops 401, 406 through each record in the subset list 109, scoring each entry 403 with the scoring algorithm described in FIG. 5. If the score is greater than the threshold 404, then the score is stored 405 with the record. If the score is less than or equal to the threshold 404, then no score is returned 410 (or no record is returned), and, in some embodiments, the record is deleted from the subset list 109. After all records are processed, the records that have scores greater than the threshold are returned 410. The threshold is a parameter that can be adjusted based on each implementation. This parameter determine how close a match needs to be to be considered a match. In some embodiments, the loop is executed in parallel on many processors using many processes or threads to process the subset list.

The scoring process can be summarized as follows:

Step 1—The system will first check each of the required fields 510, one by one, individually. If even one of the required fields has a score which falls below the specified field-level threshold, then no score will be returned. (In Table 2, all fields in the "firstname-lastname-score"—'Query Template' have a default field-level threshold. If no field-level default was defined then the overall threshold would be used.)

Step 2—The system will calculate the weighted mean of the required fields 503 using the field weights assigned and the field scores calculated for each of the required fields.

Step 3—The system will see if there are any boost fields with scores that are above their field-level threshold and ALSO above the weighted mean of the required fields and use only those scores to boost the aggregated required fields score 520.

Step 4—A new boosted aggregated score will then be calculated by taking the weighted mean of the required field scores and the boost field scores discovered in Step 3 526. This will improve or "boost" the score calculated in Step 2.

It is the boosted aggregated score which will be returned (assuming it is above the specified threshold).

FIG. 5 details the score name 403 step of FIG. 4. The score name step 403 takes an entry from the subset list 501 and the target 107 and scores the closeness of the match between the two. This match is done in two stages. First that required fields each compared 510 using a Levenstein type score and then the boost fields are compared 520 if they will increase the score.

The score name function 403 steps through each character in each field, one by one, for each target 107 to be scored, and notes each difference against the subset list entity 501 it is being compared against. If no match could be found in the search step 108 for a given target 107 then no scoring will be done for that target 107 and the assumption will be that no hit was detected.

The comparison, character by character, between the target 107 fields and the subset list field 501 field provided in a loaded 'Bad Guy List' will be done after all of the analyzer filters specified for that source 501 field have been applied to both sides. For the source, the analyzer filers are run when the entry is indexed. For target, this happens before the score is calculated.

If every character matches perfectly, then a 'Score of 1.00' will be returned 527. If "Some but not all" characters match, then a "Score" will be calculated to reflect how close the match is. A higher score will indicate a better 'match'. A lower score will indicate a worse 'match'.

A threshold parameter set threshold floor of what the scoring name 403 can return. The threshold for the search step 108, is a similar value. To make sure that only meaningful 'hits' are returned, an overall default threshold will be the same value for the search step 108 and the scoring step 110.

Here, the threshold parameter sets the minimum score that a target 107 must receive before it is returned in the response as a 'hit'. A weighted mean of each field score is calculated 503, 526 to obtain a single value for the overall score. If the overall score is below the threshold value then no result is returned in the response 516, 527. So as poor matches are detected, they can be held back, and not flood the 'Results' with too many 'False-Positives'.

The correct 'Overall Threshold' to use varies widely from organization to organization. Very risk adverse organizations, which are afraid of missing too many 'Real Hits' may set this 'Overall Minimum Threshold' as low as 80% but that could result in a very large number of 'Possible Hits' to review, and more false-positive hits. Less risk adverse organizations, might push this 'Overall Minimum Threshold' a bit higher, and accept the added risk of missing some 'Real Hits' to minimize the number of false-positive hits it will need to review and discard.

In some embodiments, there is a table of field related parameters (for example, see Table 2), and in other embodiments, the settings are hard coded into the code. Each field is designated as either Required, Boost, or Don't Care. The Don't Care fields are ignored, and in some embodiments are eliminated from the watch list at the watch list creation 300 stage. These Don't Care fields are similarly eliminated as the target 107 is entered. If the field is a Don't Care, there is no need to provide weight or threshold. The Required fields are processed in the required field stage 510 and the Boost fields are processed in the boost fields stage 520. The table also includes the weight and the threshold for each field. These values are needed in the calculations below.

TABLE 2

|  | firstname | middlename | lastname | SSN | address | city | state |
|---|---|---|---|---|---|---|---|
| weight | 1 | 0.5 | 1 | 0.2 | 0 | 0.2 | 0.2 |
| threshold | 0.8 | 0.8 | 0.8 | 0.8 | 0 | 0.8 | 0.8 |
| designation | REQUIRED | BOOST | REQUIRED | BOOST | DON'T CARE | BOOST | BOOST |

Looking to FIG. 5, the required fields 510 are processed first. Starting with the first field, the firstname in the example in Table 2, the field score is calculated 511. This calculation is one minus the Levinstein distance between the subset list entry 501 field and the target field 107 divided by the number of characters in the target 107.

$$\text{score} = x = 1 - \frac{Levenshtein(subset.firstname, target.firstname)}{length(target.firstname)}$$

If the field score is less than or equal to the threshold 512, then there is no match between this record and the target. The score name 403 returns an indication that there is no match 516, perhaps by returning a zero.

If the field score is greater than the threshold 512, then store the field score in an array 513 for later processing. Then check to see if there are any further required fields to process 514. If so, get the next field 515 and repeat the loop at the calculation of the field score 511.

If there are not more required fields 514 to process, then calculate the weighted mean score 503 by summing the product of multiplying each field score by the field weight and dividing the sum by the sum of the weights to create the weighted mean score, $\bar{x}$, where w is the field weight and x is the field score.

$$\bar{x} = \frac{\Sigma w_i x_i}{\Sigma w_i} = \frac{w_1 x_1 + w_2 x_2 + \cdots + w_n x_n}{w_1 + w_2 + \cdots + w_n}$$

Once the weighted mean is calculated, the boost fields are analyzed 520. The boost fields will only be used to increase the match score. They are not used to diminish the match score found in the required fields analysis 510. As such, they are only incorporated in the formula if the boost score exceeds the weighted mean 503.

The boost field analysis 520 begins by checking to see if there are any boost fields to process 521. If so, the field score is calculated 522. This calculation is one minus the Levinstein distance between the subset list entry 501 field and the target field 107 divided by the number of characters in the target 107.

$$\text{score} = x = 1 - \frac{Levenshtein(subset.ssn, target.ssn)}{length(target.ssn)}$$

When checking the field score 523 the score is used only if it is greater than the threshold and greater than the weighted mean, $\bar{x}$. If the field score is less than or equal to the threshold or less than or equal to the weighted mean $\bar{x}$ 523, then the field is ignored, the next field is retrieved 525 and the loop repeats the test to determine if there are more boost fields to review 521.

If the field score is greater than the threshold and greater that the weighted mean $\bar{x}$ 512, then he field score is stored in an array 524 for later processing. Then, get the next field 525 and repeat the loop at the calculation of the field score 521.

If there are not more required fields 521 to process, then calculate the aggregated score 526 by summing the product of multiplying each field score by the field weight and dividing the sum by the sum of the weights to create the weighted mean score, $\bar{x}$, where w is the field weight and x is the field score.

$$\bar{x} = \frac{\Sigma w_i x_i}{\Sigma w_i} = \frac{w_1 x_1 + w_2 x_2 + \cdots + w_n x_n}{w_1 + w_2 + \cdots + w_n}$$

Once the aggregated mean score is calculated 526, return this value to the calling routine 527.

Figure 6:
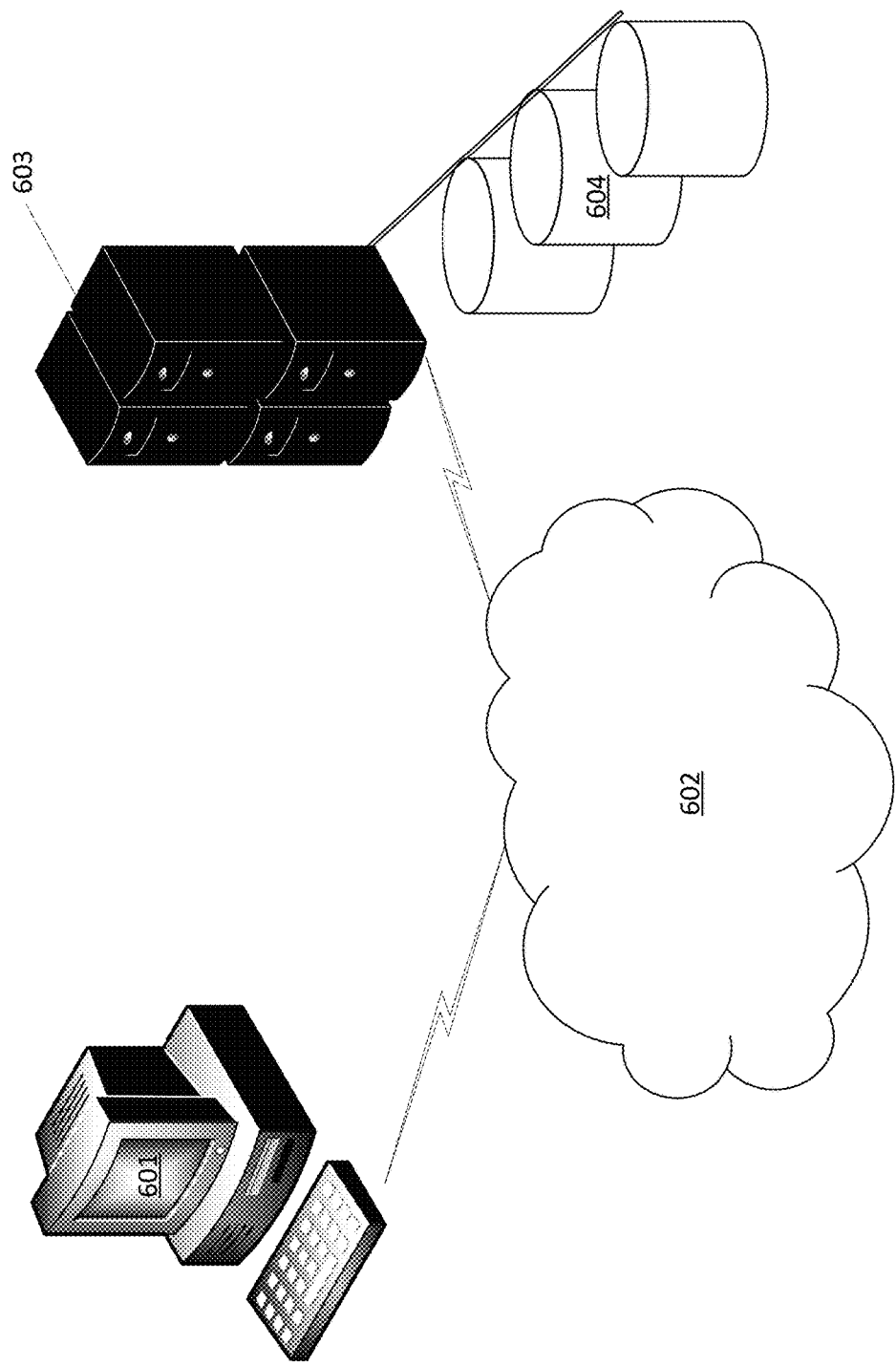
FIG. 6 is a block diagram depicting one possible hardware embodiment of the algorithms in the proceeding figures.

FIG. 6 shows one possible hardware embodiment for this invention. A personal computer, laptop, notebook, tablet, smart phone, cell phone, smart watch or similar 601 is used to provide a visual input to the process. In some embodiments, the target 107 is entered through this computing device 601. The source lists 101, 102, 103, 104 may also be selected in some embodiments. The target and the lists are sent to a special purpose, high performance computing server 603. In some embodiments, the high performance computing server 603 has a high performance floating point processor, more memory than is found on a typical computer, and additional cache memory so that the huge source lists can be stored (at least in part) and processed. The high performance computing server 603 has a large number of parallel processors in some embodiments to allow for the parallel execution of the watch list creation 300, the search step 108, and the scoring step 110. This high performance computing server 603 is electrically connected to one or more high performance disk drives 604 for storing the watch list 105, the index 106, and the subset list 109. In some embodiments, the computing device 601 communicates with the high performance computing server 603 over the internet 602.

In some embodiments, the high performance computing server 603 and the one or more high performance disk drives 604 could be distributed over the internet 602, with the functions described in FIG. 1 distributed over a plurality of servers 603 and disk drives 604. The distribution could be along functional lines in some embodiments, with the watch list creation 300 performed on one server, the search step 108 performed on another server, and the scoring step 110 performed on still a third server.

In another distributed embodiment, a plurality of servers 603 could perform all of the steps 300, 108, 110 on a portion of the watch list 105 and/or on a portion of the subset 109.

It should be appreciated that many of the elements discussed in this specification may be implemented in a hardware circuit(s), a circuitry executing software code or instructions which are encoded within computer readable media accessible to the circuitry, or a combination of a hardware circuit(s) and a circuitry or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a circuitry or control block executing code encoded in a computer readable media, or a combination of a hardware circuit(s) and a circuitry and/or control block executing such code.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the inventions have been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the inventions. In addition, while a particular feature of the inventions may have been described above with respect to only one or more of several illustrated embodiments, such feature may be combined with one or more other features of the other embodiments, as may be desired and advantageous for any given or particular application.

The invention claimed is:

1. A method for locating a target in a watch list, said method comprising:
    searching for a subset of records in the watch list that most closely match the target, wherein the searching comprises:
        reading a record from the watch list;
        performing a search Levenstein distance calculation on the target and the record; and
        storing the record in a subset list if the search Levenstein distance calculation is greater than a threshold;
    scoring the records in the subset list, wherein the scoring comprises:
        looping through each field of the records in the subset list;
        calculating a score Levenstein distance between the field in the record in the subset list and the field in the target;
        checking that the score Levenstein distance is greater than the threshold, and going to a next record in the loop if the score Levenstein distance is greater than the threshold;
        summing a product of the score Levenstein distance multiplied by a weight factor for the field; and
        dividing the product by a sum of the weight factor for the fields to derive a weighted mean score for the record;
    indicating that the target is located in the watch list if at least one weighted mean score is calculated.

2. The method of claim 1 further comprising:
    creating the watch list from one or more source lists, wherein the creating comprises:
        reading an entry from the one or more source lists;
        simplifying the entry in the one or more source lists;
        splitting the entry in the one or more source lists; and
        storing the entry in the watch list as a new record.

3. The method of claim 2 wherein the simplifying incudes converting all capital letters to lower case.

4. The method of claim 2 wherein the simplifying includes removing repeated letters.

5. The method of claim 2 further comprising transforming one or more portions of the record to enhance the performance of searches using Levenstein distance calculations, during the creating of the watch list.

6. The method of claim 1 further comprising simplifying the target.

7. The method of claim 6 wherein the simplifying includes removing punctuation.

8. The method of claim 6 wherein the simplifying includes consolidates all geographic terms into a selected geographic term.

9. The method of claim 1 wherein the searching and the scoring are performed in parallel.

10. The method of claim 1 wherein the searching and the scoring are performed in series.

11. The method of claim 1 wherein the searching and the scoring is distributed across a plurality of special purpose, high performance computing servers.

12. The method of claim 1 further comprising sorting the weighted mean score for the records.

13. The method of claim 12 further comprising indicating the record with a best match.

14. The method of claim 1 wherein the scoring further comprises selecting fields configured for boosting the weighted mean score for the record, and incorporating the field score in the weighted mean score for the field configured for boosting if the field score increases the weighted mean score.

15. A method for locating a target in a watch list, said method comprising:
    a step for searching for a subset of records in the watch list that most closely match the target by performing a search Levenstein distance calculation on the target and on each record in the watch list;
    a step for scoring the records in the subset by calculating a weighted mean score for each record with a score Levenstein distance greater than a threshold; and
    indicating that the target is located in the watch list if at least one weighted mean score is calculated to be above the threshold.

16. The method of claim 15 wherein the step for scoring further comprises incorporating a field score in the weighted mean score for boost configured fields if the field score increases the weighted mean score.

17. The method of claim 15 wherein the step for searching and the step for scoring are performed in parallel.

18. The method of claim 15 wherein the step for searching and the step for scoring are performed in series.

19. The method of claim 15 wherein the step for searching and the step for scoring is distributed across a plurality of special purpose, high performance computing servers.

20. The method of claim 15 further comprising sorting the weighted mean score for the records and indicating the record with a best match to the target.

* * * * *

UNITED STATES PATENT AND TRADEMARK OFFICE
CERTIFICATE OF CORRECTION

| | | |
|---|---|---|
| PATENT NO. | : 11,042,555 B1 | Page 1 of 1 |
| APPLICATION NO. | : 16/455811 | |
| DATED | : June 22, 2021 | |
| INVENTOR(S) | : Mark G. Kane, Richard J. Diekema, Jr. and Kaiyu Pan | |

It is certified that error appears in the above-identified patent and that said Letters Patent is hereby corrected as shown below:

On the Title Page

Please replace the word Levenstein with Levenshtein in:
Item (57) Abstract

In the Specification

Please replace the word Levenstein with Levenshtein in:
Column 2, Line 8
Column 2, Line 10
Column 2, Line 14
Column 2, Line 19
Column 2, Line 20
Column 2, Line 39
Column 2, Line 61-62
Column 2, Line 65
Column 10, Line 9
Column 13, Line 45
Column 13, Line 47-48
Column 13, Line 53
Column 13, Line 56
Column 13, Line 58
Column 13, Line 60
Column 14, Line 13
Column 14, Line 43
Column 14, Line 47

Signed and Sealed this
Twentieth Day of December, 2022

*Katherine Kelly Vidal*

Katherine Kelly Vidal
*Director of the United States Patent and Trademark Office*